United States Patent Office 3,520,114
Patented July 14, 1970

3,520,114
VORTEX AIR CLEANER ASSEMBLY HAVING UNIFORM PARTICLE REMOVAL EFFICIENCY THROUGHOUT THE ARRAY OF AIR CLEANERS
David B. Pall, Roslyn Estates, and Robert I. Gross, Roslyn Heights, N.Y., assignors to Pall Corporation, Glen Cove, N.Y., a corporation of New York
Filed June 28, 1968, Ser. No. 740,937
Int. Cl. B01d 45/12; B04c 3/00, 5/28
U.S. Cl. 55—347
18 Claims

ABSTRACT OF THE DISCLOSURE

A vortex air cleaner assembly is provided having an array of vortex air cleaners which remove contaminant particles from influent air. Each air cleaner in the array exhausts the removed particles in a scavenge flow of air through a scavenge passage into a chamber. The particles are swept from the chamber through a scavenge port by the scavenge flow. Variations in the upstream, downstream, and scavenge pressure drops between air cleaners at various points in the array cause variations in the scavenge flow resulting in poor particle removal efficiency. This invention provides a flow restricting means in the line of flow from the scavenge passage of the air cleaners to the scavenge port. The flow restricting means compensates for the differences in pressure differential referred to above and provides relatively uniform scavenge flow and uniform particle removal efficiency. A partition in the array is also provided to separate portions of the array so that the scavenge flow can be made uniform within each portion independently of the other portion.

---

This invention relates to an improved air cleaner assembly of the vortex air cleaner type.

Aircraft and particularly turbine driven aircraft, such as helicopters, normally require an extremely high flow of air into the engine during operation. When close to the ground, such aircraft stir up great amounts of dirt and dust which can rapidly destroy an engine. For example, during landing and take-off a typical small helicopter engine can ingest approximately one-half pound of dirt per minute if no air cleaner is provided, larger helicopters can ingest two to four pounds of dirt per minute without an air cleaner. This has resulted in engine failure on helicopters in combat operations in less than 10% of their normal service period, due to dust-caused erosion of the engine. Thus, the problem of removing the dust from the influent air to an aircraft engine is very serious.

The problem of removing dust from influent air is complicated by the fact that not only must dirt or dust be efficiently removed from the air entering the engine intake, but it must be removed with the least amount of power loss to the aircraft. Normally, when taking off with a full load, a helicopter requires maximum power to get high enough to translate to forward flight. If engine power is lost, for example, due to the operation of an air cleaner, the helicopter may not be able to take off with a full load and thus, the load will have to be lightened. This can mean that one or more passengers which otherwise could have been accommodated must be left behind. This is highly undesirable especially in wartime conditions.

If, however, in an attempt to maximize the power, the air cleaner is not used during take off, a large amount of dust will enter the engine and cause serious damage to the engine, and perhaps its almost immediate failure.

One method conventionally used on tractors and earth moving equipment for removing sand or dust from air entering an engine has been to provide tubular air cleaners. These air cleaners remove dust from air centrifugally, by forming a vortex or cyclone stream in the dust-laden air passing through the tube. The vortex stream is formed by either placing a deflector in the tube in the path of the influent air stream or by introducing the air stream tangentially to the tube wall, to cause the air to flow in a helical path. Since the dust and dirt particles are relatively heavy, they are thrown to the periphery of the vortex. The air at the center of the vortex is left relatively free of dust particles. The relatively clean air is normally drawn off from the center of the tube, and the dust particles collected at the periphery of the tube.

There are two types of such tubular air cleaners which employ the inertial forces acting on the contaminant particles to separate them from a gas. One type is known as a cyclone separator, in which clean air is drawn off from the center of the separator tube at the air entry end while separated contaminant particles settle into a collection chamber at the opposite end. In such an air cleaner clean air undergoes a reversal in flow direction during passage through the air cleaner.

Cyclone separators are quite efficient, and groups of separators often achieve efficiencies of better than 95%. (Efficiency as used herein relates to performance with AC coarse test dust as defined in SAE recommended practice J726a.) One typical example of a cyclone separator such as described above is shown in FIG. 2 of U.S. Pat. No. 2,323,707 to Danz.

Cyclone separators have been commonly employed on earth-moving equipment and other motorized equipment which are used in an atmosphere having a high concentration of dirt.

Cyclone separators have the disadvantage that although they provde adequate separation efficiency, they cause a high pressure drop in the air entering the engine. This causes a loss of engine power. The problem of engine power loss on earth-moving equipment is not serious since such apparatus normally has enough reserve power to operate despite a significant power loss, but this is not true of aircraft. Cyclones normally store the separated dirt and require periodic cleaning.

The other type of tubular inertial air cleaner is the vortex separator. In this type of separator, both contaminant particles and clean air are removed at the exit end of the tubular body but through separate passages. No reversal in flow direction is required. This type of air cleaner, however, is somewhat less efficient than the cyclone type air cleaner. In fact, the highest efficiency that can be obtained from a group of vortex separators without employing a scavenge flow to sweep out the separated dirt is about 80%. A typical vortex type air cleaner is shown in U.S. Pat. No. 2,323,707 to Danz, in FIG. 1 thereof. The term vortex air cleaner as used herein refers to an air cleaner which comprises a tubular air cleaner body having a central passage with an inlet and an outlet at opposite ends; a deflector adjacent the inlet for creating a vortex stream in the influent air to concentrate any contaminant particles in the air at the periphery of the passage, and clean the air at the center of the passage; and an outlet member having a central clean air passage communicating with the central passage of the tubular body and disposed within the passage at the outlet, the exterior wall of the outlet member defining a generally annular contaminant scavenge passage within the central passage of the tubular body through which pass contaminant particles while relatively clean air at the center of the passage passes through the central clean air passage of the outlet member.

Vortex air cleaners have the advantage that the pressure drop between the inlet and outlet is quite low. Thus, they cause little power loss to the engine.

Furthermore, if a scavenge flow of air is employed to sweep contaminant particles from the assembly, efficiencies comparable to those obtained by a cyclone separator can be obtained, and the unit becomes self-cleaning.

Since vortex air cleaners have relatively low pressure drop, and thus, cause little power loss to the engine, it has recently been proposed to use an array of such air cleaners on aircraft, wherein the problem of removing dust or dirt from air entering an aircraft engine is particularly acute.

The term vortex air cleaner array as used hereinafter refers to an assembly of vortex air cleaners mounted together as a unit with their axes aligned in parallel or a group of such assemblies. The vortex air cleaners are normally housed by front and rear support plates which hold the inlets and outlets of the vortex air cleaners in position. The scavenge passages of the vortex air cleaners empty into a common scavenge chamber which is normally defined in part by the front and rear support plates. A scavenge port is provided in a wall of the scavenge chamber for the removal of contaminant particles therefrom.

Many problems have occurred in providing vortex air cleaner arrays for aircraft. The conventional vortex separators normally employed on earth-moving equipment are for the most part unsuitable for aircraft use. This is due to the fact that the conditions under which the vortex air cleaners are to operate on aircraft are radically different from the conditions on earth-moving equipment. Firstly, the air cleaner array must occupy little space, and be light in weight yet still provide enough particle removal efficiency to remove substantially all dirt particles from the influent air. Conventional vortex air cleaner arrays are relatively large, and relatively heavy for use on aircraft. Further, barrier filters downstream of the air cleaner array and collection chambers for collecting separated dirt particles cannot be used within the space limitations imposed by aircraft design.

It has been found that the efficiency of particle removal of a vortex air cleaner depends on the scavenge flow drawn through the air cleaner. The scavenge flow is the portion of the influent air that is drawn off with the particulate contaminants through the annular contaminant scavenge passage of the vortex air cleaner; the pressure differential in the influent air which passes from the inlet through the annular contaminant scavenge passage as scavenge flow shall hereinafter be referred to as $\Delta P_s$. The scavenge flow, for convenience, is normally expressed as a percentage of the primary flow, i.e., the flow that passes from the inlet to the clean air outlet; the pressure differential in the primary flow passing through a vortex air cleaner from the inlet to the outlet shall hereinafter be referred to as $\Delta P_p$.

There are several factors which limit the amount of scavenge flow that can be used. One limiting factor is that the use of such a scavenge flow draws a percentage of influent air through the scavenge port with the contaminants. Since vortex air cleaners are normally used as a group of air cleaners with all the air cleaners aligned in parallel, or as a number of such groups, and since the flow capacity of a group of vortex air cleaners is limited, if too high a percentage of the influent air flow is drawn off as scavenge flow, insufficient air will proceed to the engine, and thus engine power will be sapped.

Since a blower, eductor, or other air pumping device is generally required to generate the scavenge flow, a further limitation on the amount of scavenge flow permitted is imposed by the power available to supply the pumping device. For example, a compressor or blower driven by the engine drains the engine power available to drive the aircraft. In addition, if an eductor driven by engine bleed air is used to suck the contaminants from the air cleaner, and if a high percentage of the engine bleed air is used, engine power will also be sapped. Thus, although high scavenge flows are desirable to improve the efficiency of the vortex air cleaner, it is not normally possible to provide as high a scavenge flow as would be desired.

Because of the limitations on the amount of scavenge flow previously discussed, it is customary to provide between 8 and 10% scavenge flow for an air cleaner array.

It has been found in accordance with the invention that even a small variation in scavenge flow in a separator tube can greatly affect the efficiency of particle removal. For example, a change of only a few percent in the amount of scavenge flow can mean the difference between a particle removal efficiency of about 80% and an efficiency of about 95%. In fact, it has been found that under certain pressure conditions in an array of air cleaners even negative scavenge flow (i.e., air and contaminants being sucked from the scavenge passage of one vortex air cleaner of the array into the clean air outlet of another air cleaner of the array) can occur. Therefore, in order to provide an efficient vortex air cleaner assembly, uniform scavenge flow over the array must be maintained.

In accordance with the invention there is provided in an array of vortex air cleaners in which there normally is a lower scavenge flow from at least one vortex air cleaner than the others, the improvement which comprises flow restricting means in the line of flow between the scavenge port of the array and the scavenge passage of the other vortex air cleaners, to restrict the scavenge flow therefrom, to minimize the variation in scavenge flow among all air cleaners of the array thereby providing substantially uniform scavenge flow for all vortex air cleaners of the array.

This invention provides further, in an array of vortex air cleaners in which there normally is a lower scavenge flow from at least one of the vortex air cleaners than the others, improvement which comprises a second scavenge port for receiving exhaust flow from the array and a barrier in the array dividing the array into separate portions, each portion communicating with one of the scavenge ports, said barrier being positioned between, and preventing communication between, the other vortex air cleaners and said vortex air cleaner having said lower scavenge flow such that scavenge flow from the air cleaners on each side of the barrier can be adjusted separately without affecting the scavenge flow from the air cleaners on the other side of the barrier so that substantially uniform scavenge flow can be provided on both sides of the barrier.

In the drawings:

FIG. 7 is a view of a vortex air cleaner tube assembly similar to FIG. 4 of another embodiment of this invention.

Figure 1:
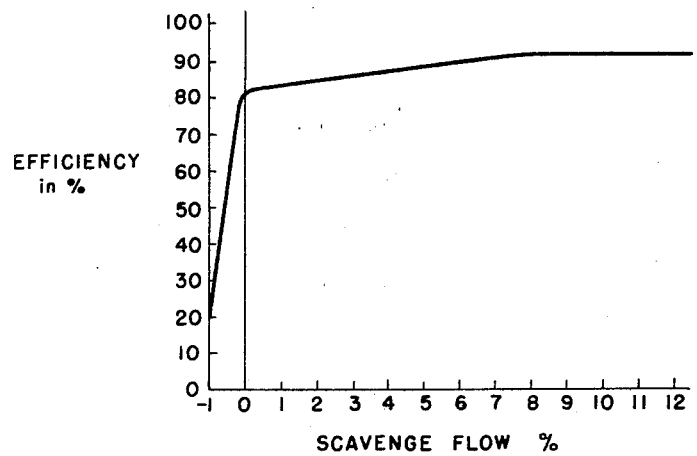
FIG. 1 is a graph showing the relationship between efficiency and scavenge flow.
Figure 2:
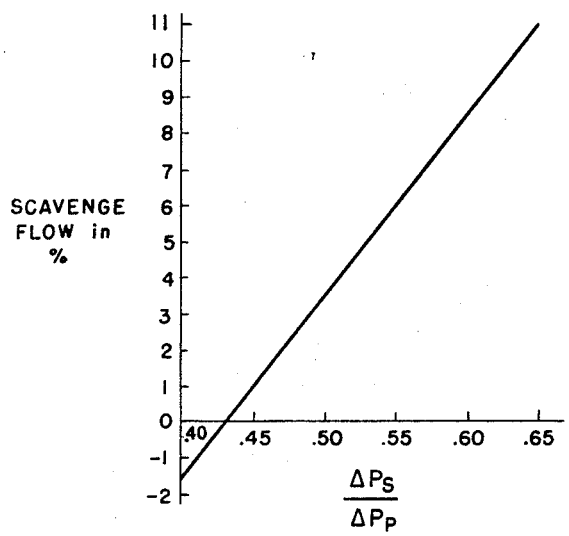
FIG. 2 is a graph showing the releationship between $\Delta P_s/\Delta P_p$ and scavenge flow.

The extent to which the efficiency of particle separation is affected by a change in the percentage of scavenge flow is clearly illustrated in FIG. 1. In FIG. 1 it can be seen that the efficiency of the air cleaner is highest at a scavenge flow of about 8%, with no substantial improvement obtained with further increase in the scavenge flow. The efficiency drops steadily as scavenge is decreased to about 80% for zero scavenge. If less than zero (i.e. negative or reverse), scavenge occurs, the efficiency drops rapidly for very small reverse scavenge flows. With little more than 1% reverse scavenge, the air cleaner affected does not contribute to the efficiency of the array. Thus, it can be appreciated that if several air cleaners of the array have a different scavenge flow than the others in the array, the overall efficiency can be severely impaired. In order to maintain the array at near optimum efficiency, the scavenge flow for the array must be approximately evenly divided among all the air cleaners. No precautions are normally required to achieve this result in arrays and used for tractors and earth-moving equipment. However, in arrays for aircraft, aerodynamic and other constraints may cause different air cleaners in the array to operate under different conditions. As may be seen in FIG. 2, a small shift in operating point for an air cleaner, either because of a shift in $\Delta P_s$ or $\Delta P_p$, can cause a large change in scavenge flow, resulting in maldistribution of scavenge and reduced efficiency.

For example, for an air cleaner operating with $\Delta P_s/\Delta P_p$ of .59, and therefore, 8% scavenge, a reduction of $\Delta P_s/\Delta P_p$ by only .08 will halve the scavenge flow and reduce the efficiency from about 92% to about 87% (an increase of 62½% in the amount of dirt passed). Since these air cleaners normally operate at a $\Delta P_p$ between 2 and 5" W.C. (water column), this reduction in efficiency can result from a pressure shift as small as 0.16" W.C. Thus, it can be appreciated that maintenance of the proper value of $\Delta P_s/\Delta P_p$ for each tube is critical to obtaining optimum efficiency for the array.

There are three factors which can cause pressure maldistribution: variations in pressure at the upstream face of the array from one point on the array to another; variations in pressure on the downstream face; and variations in the internal pressure drops through the scavenge chamber between the scavenge port and the scavenge passages of the air cleaners.

The variations in upstream pressure can be caused by restrictions in the passages carrying flow to the array, or by aerodynamic effects due to winds or high aircraft velocities. The variations in downstream pressure can be caused by an inadequate plenum downstream of the array. The internal pressure drop variations result both due to the fact that some air cleaners of the array are located further from the scavenge port than others, and because losses occur in the internal flow passages which carry the scavenge flow to the scavenge port. The net result of these variations is to cause a relatively wide variation in $\Delta P_s/\Delta P_p$ and, therefore, in scavenge flow, causing a loss in efficiency.

In accordance with this invention, it is possible to provide uniform efficiency for the separator or air cleaner tubes in an array by employing either or both of a flow restricting means and a barrier. As will be explained below, both of these mechanisms provide a relatively uniform scavenge flow for all or for a selected group of separator tubes in an array.

The flow restricting means can be any constricted portion or passage, such as an orifice, small aperture, slit, slot, or the like through which scavenge flow from each air cleaner tube must pass to reach the scavenge port of the assembly. Preferably a plate is disposed in the housing between the scavenge port and the air cleaner tubes of highest scavenge flow. The plate can have an aperture, such as an orifice, a slit, a slot or the like therein, dimensioned to restrict flow between the separator tubes and the scavenge port. It is also possible to form a small gap or narrow passage using a plate by merely spacing the end of the plate from the housing wall so that flow to the scavenge port must proceed through the restricted space defined between the end of the plate and the housing wall.

The flow restricting means is preferably positioned as close as practicable to the air cleaner tubes which are to be restricted. This makes it possible to compensate for pressure losses in the scavenge chamber as will be explained hereinafter.

It is also possible to position the flow restricting means at or adjacent to the scavenge ports of the housing when more than one port is provided and the array is divided into sections as hereinafter described to adjust the scavenge flow from each section. This can be conveniently done when pressure losses in the scavenge chamber between the air cleaner tubes and the flow restricting means in each section are so small that they need not be considered.

The flow restricting means increases the pressure drop in the scavenge flow between the inlet and the scavenge port. The pressure drop from the inlet through the flow restricting means is hereinafter referred to as $\Delta P_e$. $\Delta P_e$ is obviously equal to $\Delta P_s$ plus the pressure drop across the flow restricting means $\Delta P_r$, which latter drop varies with the square of the flow through the flow restricting means. If the degree of restriction of the flow restricting means is specified as equal to a predetermined $\Delta P_r$ at a given scavenge flow, $Q_{so}$, we may derive the equation:

$$\Delta P_e = \Delta P_s + \Delta P_r \left(\frac{Q_{sa}}{Q_{so}}\right)^2$$

where $Q_{sa}$ is the actual (as contrasted to desired) scavenge flow through the air cleaner tube.

This may also be expressed:

$$\frac{\Delta P_e}{\Delta P_p} = \frac{\Delta P_s}{\Delta P_p} + \frac{\Delta P_r}{\Delta P_p}\left(\frac{Q_{sa}}{Q_{so}}\right)^2$$

Figure 3:
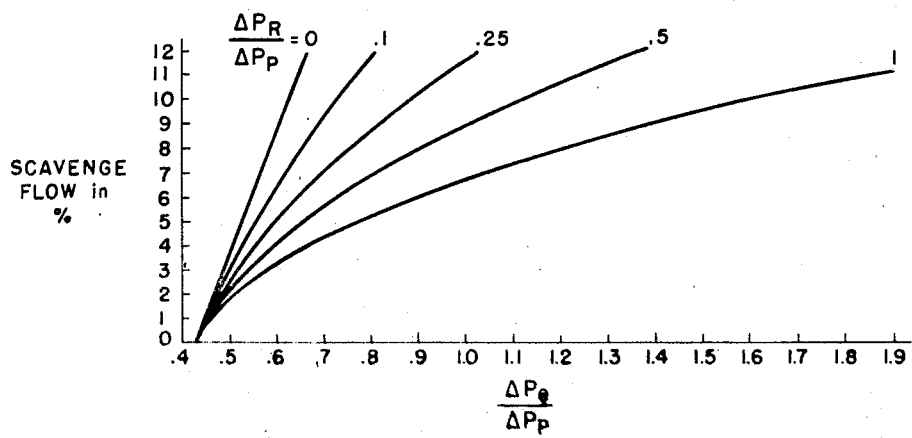
FIG. 3 is a graph showing the relationship between $\Delta P_e/\Delta P_p$ and scavenge flow.

Combining this equation with the relationship between scavenge flow and $\Delta P_s/\Delta P_p$ enables us to plot curves showing the relationship between scavenge flow and $\Delta P_e/\Delta P_p$ for various values of $\Delta P_r/\Delta P_p$. FIG. 3 shows five different curves showing this relationship for various values of $\Delta P_r/\Delta P_p$ established with reference to values at 10% scavenge. The $\Delta P_r/\Delta P_p=0$ curve is the curve of FIG. 2 (representing no restriction), reproduced for ease in comparison. As may be seen, for $\Delta P_r/\Delta P_p=0$, the difference between $\Delta P_e/\Delta P_p$ for no scavenge and for 12% scavenge is only 0.24 and the difference between 10% and 6% is .08 (which could be as little as 0.16" W.C. as previously mentioned).

By contrast, the curves where restriction is present show a substantial increase in the range of pressure variation they can accommodate. For example, with $\Delta P_r/\Delta P_p$ as low as 0.1, the variation in pressure, which can be accommodated before the scavenge flow drops from 10% to 6%, is 180% of that for the unrestricted case, and is 300, 500 and 900% respectively for the $\Delta P_r/\Delta P_p=.25$, .5 and 1.0 curves. Thus, it may be seen that the flow restricting means substantially reduces the effect of a pressure maldistribution on an air cleaner tube and tends to equalize the scavenge flow among all the tubes of the array. Moreover, it is to be noted that although the pressure loss incurred due to use of the flow restricting means is quite small, the effect produced in the equalization of scavenge flow is very pronounced.

The $\Delta P_r$ imposed by the flow restriction can be as high as possible within the working limits of the available scavenge pumping device, since the higher the $\Delta P_r$, the more difficult it will be to pump the scavenge flow from the assembly. The $\Delta P_r/\Delta P_p$ provided by the flow restriction should generally not be less than about 0.03 at 10% scavenge and preferably not less than 0.1. If a high maldistribution exists, high values of $\Delta P_r/\Delta P_p$ may be required. Generally, the worse the maldistribution, the higher the $\Delta P_r$ required.

Figure 5:
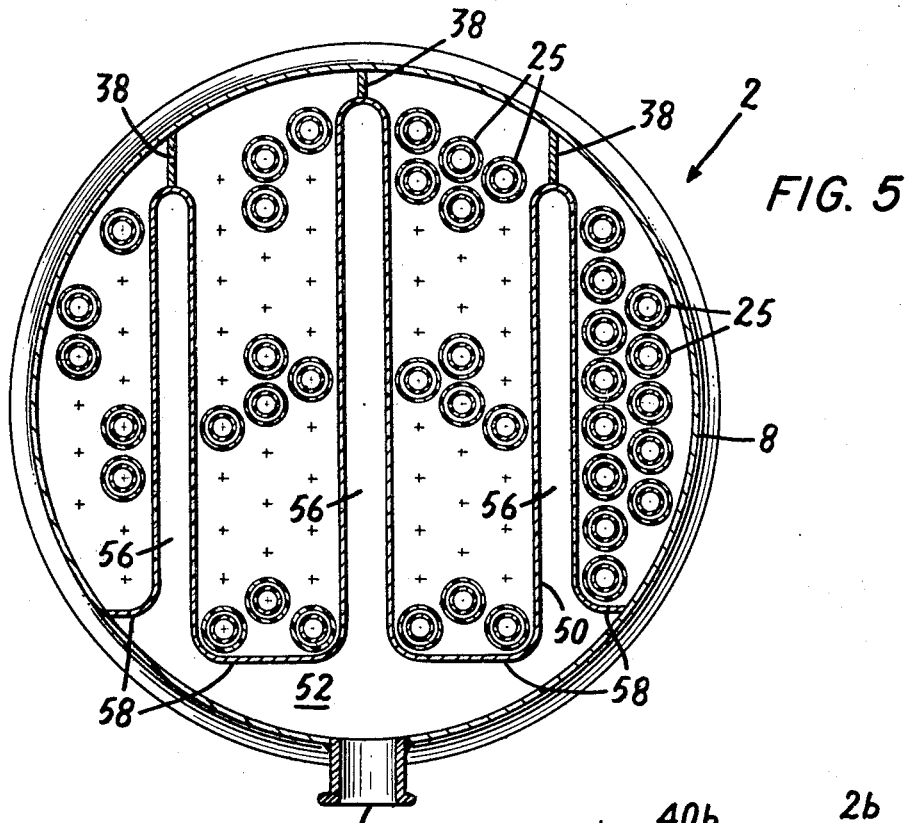
FIG. 5 is a top view in cross section of the air cleaner assembly of FIG. 4 taken along the line 5—5 of FIG. 4.

The preferred means for restricting flow from all the tubes in the array is a convoluted plate positioned between the entire array and the scavenge chamber and spaced from the housing wall to define a narrow passage or gap through which all scavenge flow proceeds. The plate of the convolutions can extend between portions of the array of separator tubes as can be seen by reference to FIG. 5 to define flow ducts to direct scavenge flow to the scavenge port.

When a flow restricting passage is formed in this manner, it is possible to compensate both for the variation in $\Delta P_e$ caused by the layout of the array and that caused by aerodynamic effects. This can be done, for example, when a narrow passage is used, by varying the size of the passage according to the distance each air cleaner tube is from the scavenge port. Thus, for example, the scavenge flow from air cleaner tubes closer to the scavenge port passes through a more restricted opening than that from air cleaner tubes further from the scavenge port. Thus, the $\Delta P_e$ of the farthest air cleaner tubes would be about equal to the $\Delta P_e$ of the air cleaner tubes closer to the scavenge port. Thus, the variations in $\Delta P_e$ due to the layout of the assembly are compensated for by varying the size of the passage while at the same time the variations in $\Delta P_e$ caused by aerodynamic effects are still compensated for over the entire array by the overall increase caused by the restriction itself.

Although it is desirable, it is not necessary, however, that the flow restricting means be positioned in the line of scavenge flow from all air cleaner tubes of the array to the scavenge port. It need only be positioned between the scavenge port and the air cleaners of significantly greater scavenge than the remainder.

If the flow from a relatively large number of air cleaner tubes is to be restricted, a plate similar to that described above defining a narrow passage adjacent the desired tubes is preferred. However, if the flow from only a small number of tubes is to be restricted, it is preferred to provide a restriction at the annular contaminant scavenge passage at the separator tubes whose scavenge flow is too great. This can be done quite conveniently by providing a lip on the outlet member of the air cleaner which extends toward the wall of the air cleaner body, thus diminishing the width of the annular passage. This also can be done by providing orifices in the tube wall which define a generally annular scavenge passage and extending the tube to meet the exterior wall of the outlet member. It is of course also possible to use this flow restricting means to restrict scavenge flow from all of the separator tubes merely by forming a lip on the outlet member of every tube.

In the embodiment in which a flow restricting means, such as a narrow passage defined by the end of a plate, or a lip on an outlet member is positioned to effect the $\Delta P_e$ of all of the tubular air cleaners and the scavenge port, the size of the restriction should be as small as possible without blocking the flow of the contaminants to the exhaust port and should be commensurate with the scavenge pump power available.

For a given scavenge pressure and flow volume, the pressure differential caused by the flow restricting means can be calculated by reference to the well known equations for the differential pressure caused by flow through an orifice. For example, one such equation for flow through an orifice is:

$$Q = KA\sqrt{\frac{2g\Delta_p}{\varrho}}$$

where

Q is the flow
K is the contraction coefficient, usually 0.6
$\varrho$ is the density of the gas
A is the area of the orifice
$\Delta_p$ is the pressure drop, and
g is the force of gravity Using this equation is possible to determine how much restriction is necessary to produce the desired $\Delta P_e$. To determine the pressure maldistribution across the array due to aerodynamic effects, the pressure in the array can be measured at several different points.

In a situation where a narrow passage of increasing width is used to compensate both for aerodynamic effects and for friction and other pressure losses in the array, the pressure at the farthest point in the array is measured and the pressure losses are calcualted by reference to well known fluid dynamic equations.

As indicated above, a partition may be used in certain instances either in place of, or in combination with, the flow restricting means. Occasionally, the conditions that cause a maldistribution of scavenge flow at portions of the array of air cleaner tubes are so severe that a flow restricting means cannot balance the scavenge flow in the array without increasing the overall $\Delta P_e$ to a point that is quite high. In such a situation, a barrier or partition can be provided in the array to divide the array into separate noncommunicating segments. Each segment will be formed with an additional scavenge port on the opposite side of the partition into which that portion of the array can feed. When a barrier or partition is used, scavenge flow from each separate portion of the array can be adjusted according to the $\Delta P_s$ of that particular portion by regulating a scavenge pumping device. It is also possible to provide each segment with flow restricting means and thus, balance scavenge flow in each segment connecting all segments to as few as one scavenge pumping device.

Figure 4:
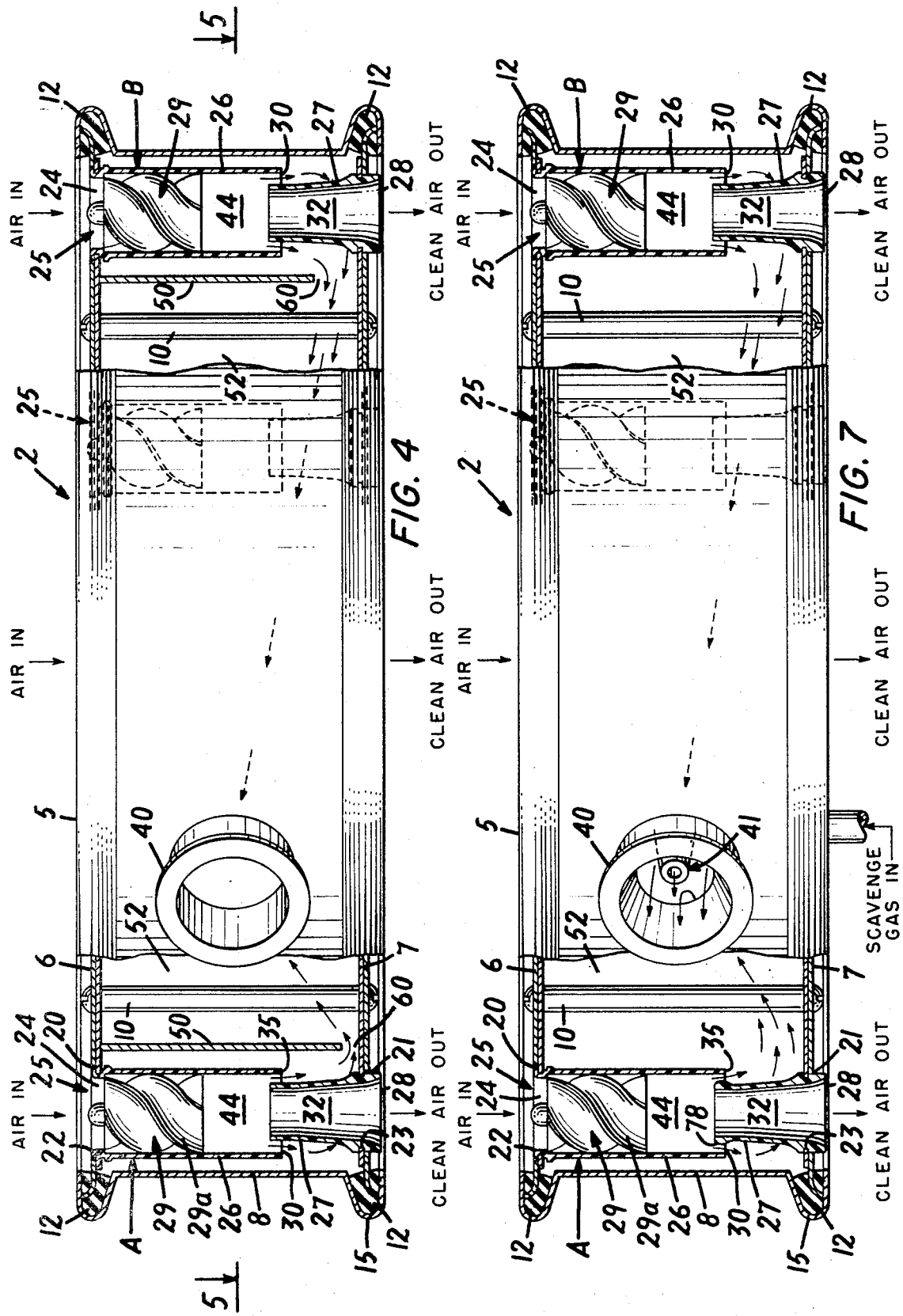
FIG. 4 is a side view, partially broken of a vortex air cleaner assembly in accordance with this invention.

In FIG. 4, a vortex air cleaner tube assembly in accordance with this invention is shown. It comprises an array 2 of air cleaners 25 having a housing 5 consisting of a front support plate 6, a rear support plate 7 and a peripheral rim 8. The front and rear support plates 6 and 7 are held together by bolts 10 and are shock mounted to the rim 8 by rubber liners 12 disposed within channels 15 formed on the edges of the rim 8. The ends of the plates 6 and 7 are flared and embedded in these liners. The front and rear support plates 6 are formed with a plurality of apertures 20 and 21 each of which accommodates and supports an air cleaner tube 25. Each air cleaner tube 25 comprises a tubular body 26 having a central passage 44, an inlet 24 and an outlet 28. A vaned deflector 29 is disposed within the central passage 44 adjacent the inlet 24. The tubular body 26 is made of nylon.

The deflector 29 is made of nylon and is bonded in position at the inlet by a resin adhesive. The vanes 29a of the deflector are helical.

A generally tapered tubular outlet member 27 is disposed with one end extending into the outlet 35 of the passage 44. The outlet member has a central open passage 32 therethrough for the removal of clean air. The outlet defines an annular space 30 between the tubular body 26 at the periphery of the tube for the removal of dirt particles.

The apertures 20 on the front support plate 6 engage a flange 22 on the inlet 24 of each tubular body 26 of each separator. The apertures 21 in the plate 7 each engage a groove 23 on the outlet member 27 of each separator tube 25. The space between the support plates 6 and 7 (which defines the interior of the housing), communicates with the annular contaminant scavenge passage 30 of each separator and defines a scavenge chamber 52. A scavenge port 40 for the scavenge chamber 52 is provided in the rim 8 between the plates 6 and 7. The scavenge port 40 is normally connected to the suction port of a blower (not shown). The clean air passes through the central passage 32 of the outlet member without entering the contaminant scavenge chamber 52. Under ideal conditions, the average pressure drop through each tube at 8 s.c.f.m. is approximately 3.3″ W.C. from the inlet 24 of each tube to the clean air exhaust of each tube. Under the same conditions and with a 0.8 s.c.f.m. scavenge flow, $\Delta P_s$ i.e., the pressure drop between the inlet 24 and the scavenge chamber 52 for each tube (absent any flow restricting means) is about 2.1″ W.C. However, the $\Delta P_s$ of each tube can vary greatly from tube to tube depending upon its position in the array, and the aerodynamic effects to which it is subjected. For example, in the array shown in FIG. 4, separator tube A is closer to the port 40 than separator tube B. Thus, there is less friction acting on the air passing from tube A to port 40 than on that passing from tube B and consequently there will be a difference in the $\Delta P_s$ from each of these tubes. This, as explained above, adversely affects the efficiency of tube B. In order to overcome this problem, a plate 50 is provided to add a pressure drop $\Delta P_r$, and produce a pressure drop $\Delta P_e$ from the inlet 54 of each tube to the scavenge chamber 52 as previously described. This plate 50 extends generally perpendicularly from the plate 6 toward the plate 7 and terminates just short thereof to define a flow restricting passage 60 between the air cleaner tube 25 and port 40. The plate 50 is a single convoluted plate, which defines flow ducts 56 within the array. The plate 50, of course, could comprise several joined plate sections.

The plate 50 extends completely between the plates 6 and 7 at the ends 58 of the ducts adjacent the scavenge port 40. This is to ensure that the flow from each tube in the structure will not have an alternative low-pressure-path through which the flow could proceed to the scavenge port 40 without passing through the slot and into a duct since the pressure differential would then not be significantly altered by the slot. Thus, there is no passage through which flow can proceed at this point, and flow from the separator tubes passes into the ducts 56 rather than passing directly to the scavenge port 40. At the end of each duct 56 a barrier 38 is provided. These barriers 38 prevent communication between the portions of the array and prevent the pressure conditions in one portion from effecting another portion.

The $\Delta P_r$ introduced by the plate 50 makes the air cleaner tubes A and B less sensitive to differences in $\Delta P_e$ between them as described above. However, since the air cleaner B is further from port 40 than air cleaner tube A, some difference in $\Delta P_e$ will still occur. To compensate for this, the width of the plate 50, and thus, the size of the narrow passage 60 varies, according to the distance the tube or group of tubes adjacent are from the port 40. The passage 60 is narrow adjacent the air cleaner tubes closest to the port 40 and is less narrow adjacent the tubes farthest from the port 40. As can be seen by reference to FIG. 4, the passage 60 is narrowest adjacent the tube A and wider adjacent the tube B. This modifies the pressure differential between the inlet of each tube and the scavenge port 40 and thus, it compensates for the difference in $\Delta P_e$ between tube B and tube A due to the fact that the tube B is farther from the port 40 than the tube A. Therefore, there will be little variation in scavenge flow between tubes A and B and the efficiency of these tubes will be about the same.

The air cleaner array of FIG. 4 without the flow restricting means was tested in a wind tunnel apparatus simulating the anticipated aerodynamic environment and found to have an efficiency of 88% with 8% scavenge flow with $\Delta P_p$ about 3.3″ W.C. The plate 50 was then installed. The resulting slot 60 was dimensioned to produce $\Delta P_r$ varying from about 0.7″ W.C. farthest from port 40 to 1.4″ W.C. adjacent port 40 at 8% scavenge. The unit was retested and the efficiency was found to be 92%.

It is to be noted that the plate 50 and the passage 60 only effect the $\Delta P_e$. There is no effect on the pressure differential between the inlet 24 and the clean air exhaust outlet 28. Thus, no loss in engine power occurs due to the plate 50 and the passage 60.

Figure 6:
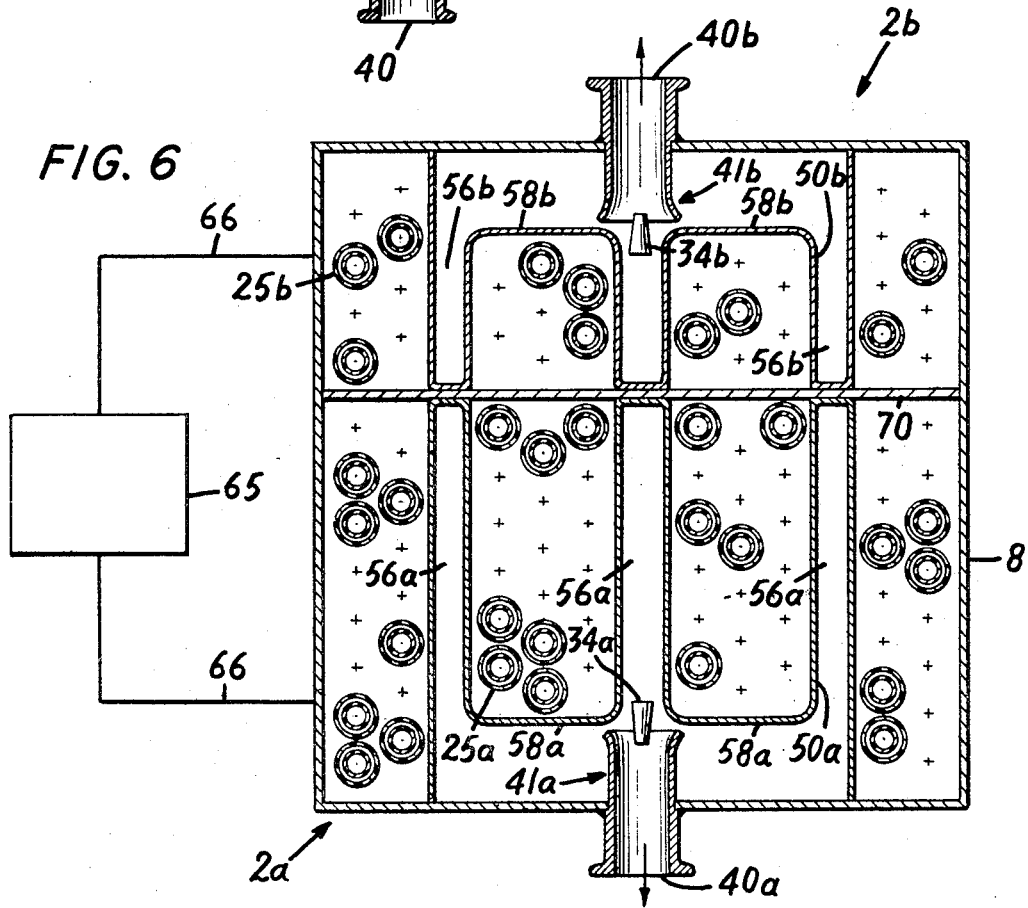
FIG. 6 is a view similar to FIG. 5 of another embodiment of this invention.

In FIG. 6, an embodiment of this invention employing a partition 70 which divides the array 2 into two segments 2a and 2b is shown. The air cleaner tubes 25b in the segment 2b, in the aircraft in which they are to be used, have a quite high $\Delta P_p$, averaging 3.8″ W.C. as compared to the air cleaner tubes 25a in the segment 2a whose $\Delta P_p$ averages 2.6″ W.C. due to an obstruction upstream of this portion of the array. In order to simplify the problem of compensating for the greatly different pressure differentials the partition 70 is formed in the array 2. The partition 70 prevents communication between air cleaner tubes in the segments 2b and 2a, and defines two separate contaminant scavenge chambers in the array 2 which communicate with separate scavenge ports 40b and 40a. Separate scavenge flows are provided for each segment of the array by separate eductors 41a and 41b so that the higher $\Delta P_e$ of the air cleaner tubes in segment 2b (required because of the higher $\Delta P_p$) can be accommodated without effecting the scavenge flow from the air cleaner tubes in segment 2a. The eductors are powered by compressed air from an engine or other source 65 and connected into nozzles 34a and 34b via lines 66. The housing is also formed with plates 50a and 50b, ducts 56a, 56b and plate ends 58a and 58b similar to that shown and described above in connection with FIG. 5. These plates adjust the $\Delta P_e$ from the tubes in each segment of the array according to their position relative to the exhaust ports 40a and 40b. For both segments the eductors were adjusted to provide scavenge flows of 8%; both segments yielded 92% particle removal efficiency.

In FIG. 7, another embodiment of this invention is shown. FIG. 7 is similar to FIG. 4 with the exception that the flow restricting means is a lip 75 on the outlet member 27 of tube A. The lip 75 reduces the width of the scavenge passage 30 as compared to that of the scavenge passage of tube B. This causes an increase in $\Delta P_e$ from tube A to balance the higher $\Delta P_e$ of tube B due to the fact that tube B is further from the exhaust port than tube A. An eductor 41 is provided as a scavenge pumping device.

Having regard to the foregoing disclosure, the following is claimed as the inventive and patentable features thereof:

1. In a vortex air cleaner assembly having an array of vortex air cleaners and in which there normally is a lower scavenge flow from at least one vortex air cleaner than the others of the array, the combination, which comprises a plurality of vortex air cleaners, each air cleaner comprising a tubular body having an inlet at one end, an outlet at the opposite end, and a central passage therebetween; a deflector coaxially mounted in the passage adjacent the inlet, said deflector having a plurality of helical vanes abutting the wall of the passage, and supported on a central hub, said vanes being positioned at an angle to the line of air flow from the inlet to the outlet, so as to create a vortex stream in the influent air which concentrates the contaminant particles in the air at the periphery of the central passage, thereby leaving the air at the center of the passage relatively clean; a generally tubular outlet member positioned at the outlet end of the tubular body having an inlet at one end disposed within the central passage of the tubular body, an outlet at the opposite end and a central passage therebetween for delivery of clean air from the central passage of the tubular body, the inlet of said outlet member being of lesser diameter than the outlet of the tubular body and defining an annular contaminant exhaust passage between the exterior of the outlet member and the wall of the central passage of the tubular body for the passage of a scavenge flow of air containing contaminant particles; a housing including a front support and rear support for the vortex air cleaners, said supports engaging the plurality of air cleaners adjacent the air inlets and the clean air outlets of the air cleaners, and holding the plurality of air cleaners in spaced apart positions defining the array, said housing defining a scavenge flow chamber between the front and rear supports communicating with the annular contaminant exhaust passage of each air cleaner so as to receive contaminant particles therefrom; a scavenge flow port in the housing communicating with the scavenge flow chamber in the housing for the removal of contaminant particles therefrom such that air containing contaminant particles passes from the air cleaner inlet, through the central passage of the air cleaner in a vortex stream to the annular contaminant exhaust passage and passes therethrough into the scavenge flow chamber and proceeds from the scavenge chamber leaving the assembly via the scavenge port; and flow restricting means spaced from said other air cleaners and positioned in the scavenge flow chamber in the line of flow between the annular contaminant exhaust passage of said other air cleaners of the array and the scavenge port, said flow restricting means defining a flow restriction through which flow from each of said other air cleaners must pass to reach the scavenge flow port to thereby restrict the scavenge flow from said other air cleaners of the array to minimize the differences in scavenge flow among all air cleaners of the array thereby providing substantially uniform scavenge flow for all vortex air cleaners of the array.

2. A vortex air cleaner assembly in accordance with claim 1 in which the flow restricting means defines a flow restriction through which flow from all of the air cleaners of the array must pass to reach the scavenge port.

3. A vortex air cleaner assembly in accordance with claim 1 in which the flow restricting means comprises an apertured plate.

4. A vortex air cleaner assembly in accordance with claim 3 in which the aperture is an orifice.

5. A vortex air cleaner assembly in accordance with claim 1 in which the flow restricting means defines a narrow passage.

6. A vortex air cleaner assembly in accordance with claim 5 in which the narrow passage is formed between one of the supports and a plate spaced from the support and positioned within the scavenge flow chamber.

7. A vortex air cleaner assembly in accordance with claim 1 in which the flow restricting means defines different size flow restrictions at different locations in the scavenge flow chamber.

8. A vortex air cleaner assembly in accordance with claim 1, in which the flow restricting means also defines flow ducts within the scavenge flow chamber.

9. A vortex air cleaner assembly in accordance with claim 1 in which the front and rear supports comprise front and rear support plates, and in which the flow restricting means comprises a baffle extending perpendicularly from the front support plate toward the rear support plate but terminating short thereof so as to define between the plate and the rear support a flow restriction in the scavenge flow chamber.

10. A vortex air cleaner assembly in accordance with claim 9 in which the baffle is positioned adjacent to said other air cleaners.

11. A vortex air cleaner assembly in accordance with claim 1 in which the flow restricting means is dimensioned so as to provide a flow restriction sufficient to produce a $\Delta P_r/\Delta P_p$ which is at least about 0.03 at 10% scavenge flow.

12. A vortex air cleaner assembly in accordance with claim 1 in which the flow restricting means is dimensioned so as to produce a $\Delta P_r/\Delta P_p$ which is at least about 0.1 at 10% scavenge flow.

13. A vortex air cleaner assembly in accordance with claim 1 in which the front and rear supports comprise apertured front and rear support plates, the vortex air cleaners being supported in the apertures of the front and rear plates at the inlet and outlet thereof, and in which the flow restricting means comprises a convoluted baffle extending from the front support plate toward the rear support plate and defining a flow restriction between the end of said baffle and the rear support plate, said baffle also defining flow ducts in the scavenge flow chamber for directing scavenge flow to the scavenge flow port.

14. A vortex air cleaner assembly in accordance with claim 13 in which the baffle defines different size flow restrictions at different locations in the scavenge flow chamber.

15. A vortex air cleaner assembly in accordance with claim 13 in which portions of the baffle extend completely between the front and rear support plates to provide a barrier to scavenge flow at said portions.

16. In a vortex air cleaner assembly having an array of vortex air cleaners and in which there normally is a lower scavenge flow from at least one vortex air cleaner than the others of the array, the combination which comprises, a plurality of vortex air cleaners, each air cleaner comprising a tubular body having an inlet at one end, an outlet at the opposite end, and a central passage therebetween; a deflector coaxially mounted in the passage adjacent the inlet, said deflector having a plurality of helical vanes abutting the wall of the passage, and supported on a central hub, said vanes being positioned at an angle to the line of air flow from the inlet to the outlet, so as to create a vortex stream in the influent air which concentrates the contaminant particles in the air at the periphery of the passage, thereby leaving the air at the center of the passage relatively clean; a generally tubular outlet member positioned at the outlet end of the tubular body having an inlet at one end disposed within the central passage of the tubular body, an outlet at the opposite end, and a central passage therebetween for delivery of clean air from the central passage of the tubular body, the inlet of said outlet member being of lesser diameter than the outlet of the tubular body and defining an annular contaminant exhaust passage between the exterior of the outlet member and the wall of the central passage of the tubular body for the passage of a scavenge flow of air containing contaminant particles; a housing including a front support and rear support for the vortex air cleaners, said supports engaging the plurality of air cleaners adjacent the air inlet and the clean air outlet of the air cleaners, and holding the air cleaners in spaced apart positions defining the array, said housing defining a scavenge flow chamber between the front and rear supports communicating with the annular contaminant exhaust passage of each air cleaner so as to receive contaminant particles therefrom; first and second scavenge flow ports in the housing communicating with the scavenge flow chamber in the housing for the removal of contaminant particles therefrom; and a barrier in the housing positioned in the scavenge flow chamber and extending thereacross so as to divide the array into separate portions and prevent flow between said portions, each portion communicating with a different one of the scavenge ports, one portion comprising said other air cleaners and said other portion comprising said air cleaners of lower scavenge flow, such that the scavenge flow in each portion can be adjusted separately without affecting the scavenge flow from the air cleaners on the other side of the barrier so that substantially uniform scavenge flow can be provided on each side of the barrier.

17. A vortex air cleaner assembly in accordance with claim 16 in which a flow restricting means is provided in each portion of the array, said flow restricting means defining a flow restriction through which flow must pass from the vortex air cleaners to reach the scavenge port to minimize variations in scavenge flow from said air cleaners in each portion of the housing.

18. A vortex air cleaner assembly in accordance with claim 16 in which the scavenge ports are connected to a common scavenge pumping device.

(References on following page)

References Cited

UNITED STATES PATENTS

| | | | |
|---|---|---|---|
| 1,338,143 | 4/1920 | McGee | 55—348 |
| 1,372,714 | 3/1921 | Milliken | 55—347 |
| 2,323,707 | 7/1943 | Danz | 55—347 |
| 2,671,560 | 3/1954 | Fontein et al. | 209—211 |
| 2,847,087 | 8/1958 | Johnson | 55—396 |
| 3,071,915 | 1/1963 | Hardy | 55—337 |
| 3,165,390 | 1/1965 | Parken et al. | 55—431 |
| 3,264,806 | 8/1966 | Neumann | 55—346 |
| 3,360,909 | 1/1968 | Barnerias | 55—348 |
| 3,362,155 | 1/1968 | Driscoll | 55—416 |
| 3,401,506 | 9/1968 | Burdock | 209—144 |

FOREIGN PATENTS

| | | |
|---|---|---|
| 623,072 | 7/1961 | Canada. |
| 1,019,674 | 11/1952 | France. |
| 511,510 | 8/1939 | Great Britain. |

HARRY B. THORNTON, Primary Examiner

B. NOZICK, Assistant Examiner

U.S. Cl. X.R.

55—348, 431, 457, 468; 209—144